Jan. 27, 1970  H. FISCHER ET AL  3,491,875
KIT FOR MAKING ADHESIVE
Filed Dec. 17, 1968  2 Sheets-Sheet 1
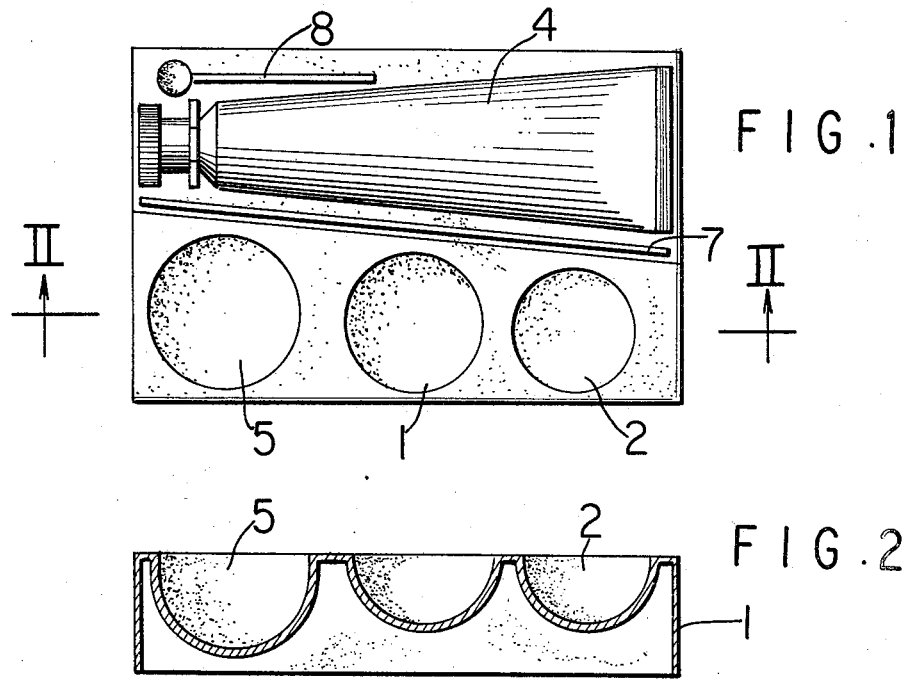
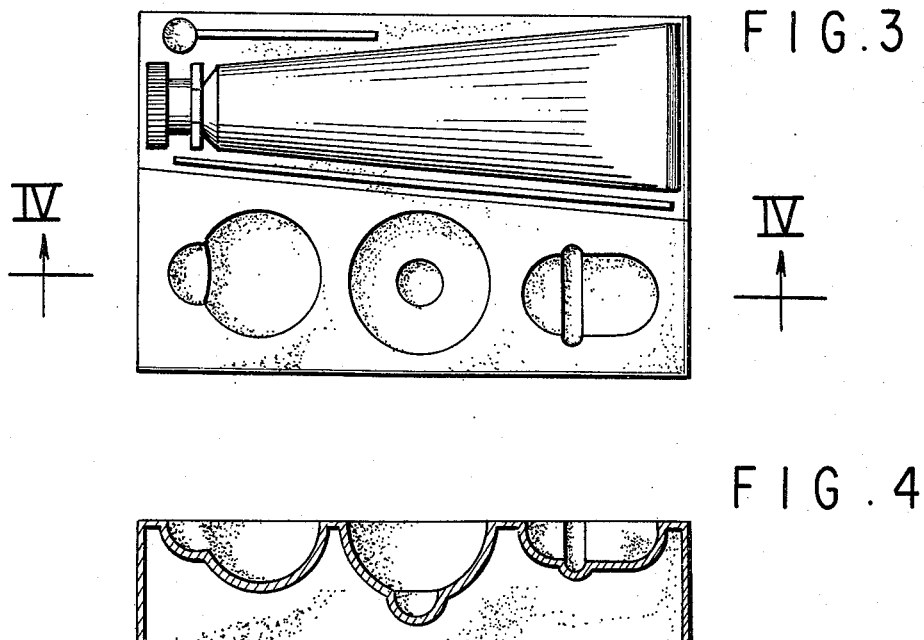
INVENTORS
HERMANN FISCHER
PETER VIERKÖTTER
BY
ATTORNEYS United States Patent Office 3,491,875
Patented Jan. 27, 1970

3,491,875
KIT FOR MAKING ADHESIVE
Hermann Fischer, Hilden, Rhineland, and Peter Vierkotter, Opladen-Lutzenkirchen, Germany, assignors to Henkel & Cie., G.m.b.H., Dusseldorf-Holthausen, Germany, a corporation of Germany
Filed Dec. 17, 1968, Ser. No. 784,380
Claims priority, application Germany, Jan. 30, 1968, H 65,160
Int. Cl. B65d 79/00
U.S. Cl. 206—47                                                  14 Claims

ABSTRACT OF THE DISCLOSURE

A kit for making an adhesive which includes a synthetic resin, a hardener, a measuring means for measuring out either the resin or the hardener, and one or more mixing compartments of varying volumes where the components of the adhesive are mixed. The relationship of the volumetric capacity of the mixing compartments to that of the measuring means being in a predetermined ratio.

---

This invention relates to a kit which contains the necessary components for making an adhesive, a measuring means, and one or more mixing compartments wherein the components are blended. Since the components must be blended in specific ratios, the volumes of the measuring means and the mixing compartments are also correlated.

THE PRIOR ART

In a two-compartment adhesive system, wherein one component is a synthetic resin and the other one is a hardener, each component must be packaged separately prior to use. When some of the adhesive is required, the components are mixed and then used before it hardens. Kits of this general nature are known, as described for example, by the German Patent 1,201,234 wherein two pasty components of the adhesive are disposed in a package having a central compartment for one component and a channel-like compartment surrounding the central compartment for the other component. When it is desired to mix these components to produce an adhesive, the package is deformed in such a way that a single mixing compartment is formed in which the two components are brought together and therein mixed.

Kits, such as described above, have a number of disadvantages. They can only be used one time. Once the package has been deformed, it cannot be reformed or reconstructed to its original shape, and therefor, must be disposed. The total contents of such a kit must be mixed regardless of the amount of adhesive actually needed. The result is that the excess adhesive is wasted since the hardened adhesive cannot be reclaimed. Apart from the cost of the package, loss of the excess adhesive can seldom be avoided.

In the case where one component is pulverulent and the other a thin liquid, it has been proposed to add dropwise the thin liquid to the pulverulent material. This scheme has not worked out for the simple reason that the synthetic resin is usually a highly viscous substance and drop-wise addition is impossible.

OBJECTS OF THE INVENTION

The object of this invention is to obviate disadvantages of the prior art devices.

A further object is to provide a kit by use of which one could make only as much adhesive as was needed.

A still further object is to make the kit, or portions thereof, from construction materials which would effectively prevent adherence of the components of the adhesive to the walls of the kit.

Other objects will become apparent from examination of the appended disclosure.

DESCRIPTION OF THE INVENTION

The kit described herein obviates the disadvantages of the prior art devices. This kit can be used many times until the components of the adhesive are exhausted and then it can be re-used, by replenishing the components. Only the neceessary amount of adhesive can be made, retaining the remainder of the resin and the hardener for future use.

Referring to the drawing:

FIG. 1 is a plan view of one embodiment of the kit. Pulverulent hardener is absent.

FIG. 2 is a cross-sectional view taken along plan II—II in FIG. 1.

FIG. 3 is a plan view of another embodiment of the kit showing three mixing compartments.

FIG. 4 is a cross-sectional view taken along plan II—II in FIG. 3.

Figures 5, 6, 7:
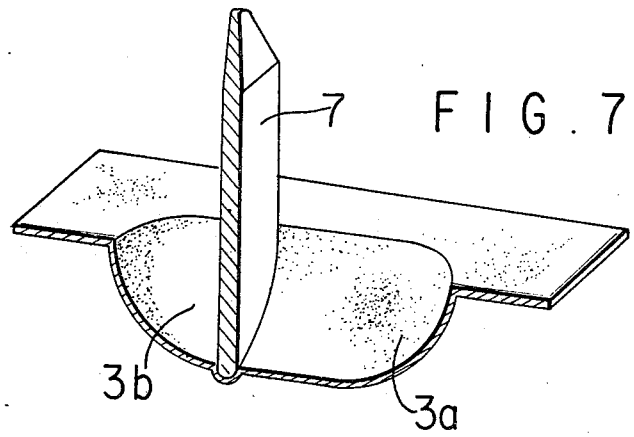
FIG. 5 is a view in cross-section of the embodiment illustrated in FIG. 1 showing polyethylene measuring compartments.
FIG. 6 is a view in cross section of FIG. 3 showing measuring compartments and the separator made of polyethylene.
FIG. 7 is an enlarged view of the measuring compartments and the separator of the embodiment illustrated in FIGS. 3 and 4.

The kit, to be fully described hereinafter, consists of a package or a carton which houses a synthetic resin, a hardener, a measuring means, and a mixing means. The carton is provided with several mixing veessels. At least one of the components will be in a paste or a highly viscous form. The other may be a paste or a powder.

In particular, a new packing should be able to be economically produced and suitable to prepare at any time only the quantity of adhesive which is needed for the task in hand. Further the stock of the two components should be able to be measured independently of the amounts required later for further tasks, thus the new packing should remain utilisable until all the adhesive has been completely used.

It is possible by this means, when a pulverulent component is used as hardener, to introduce into the measuring vessel a specified amount of this component measured by means of a measuring spoon, then to fill the measuring vessel, which is dimensioned in volume according to the mixing ratio, up to the edge with the other pasty component, the synthetic resin, and finally to mix the contents by means of a spatula.

The magnitude of the volume of the measuring vessel is of course able to be freely selected. On account of the fixed mixing ratio of the two components, however, the volume of the measuring spoon, which may be added to the packing, is fixed by the volume of the measuring vessel.

For the production of varying quantities of adhesive it is advisable to provide several measuring vessels which, as regards their volume, are in the proportion of 1:2:3, etc. and therefore can be charged with one, two, three, etc. measured spoonfuls of the pulverulent component.

It is possible in this way to adapt the quantity of adhesive to the requirements of the task at hand.

In FIG. 1, the kit is shown as consisting of a carton, mixing compartments 1 and 2 as well as hardener storage compartment 5, provided in said carton. The compartments may be any desired shape, but are preferably hemispherical. Obviously, however, other shapes, e.g. oval or rounded off groove-shaped formations are also suitable.

Measuring spoon 8 is disposed on the carton on one side of the tube of synthetic resin 4, while spatula 7 is disposed on the opposite side thereof.

The volumes of the mixing compartments 1, 2 may be in proportion of 1:2, and if additional mixing compartments are provided, then respective proportions may be 1:2:3, etc. The volume of spoon 8 is correlated to the volume of the mixing compartment and the mixing ratio of the resin to hardener. The volume of the spoon can be selected so that one spoonful of a component will be added to the smallest mixing compartment, two spoonfuls to the larger one, etc.

Examples of suitable synthetic resins which can be used in conjunction with the hardener to produce an adhesive, are epoxy resins which are characterized by the presence of the epoxy group

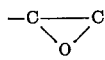

The most wisely used epoxy resins are made by reacting epichlorohydrin with bisphenol A, although other polyols, such as aliphatic glycols and novolac resins, can be substituted for bisphenol A. A type of a suitable epoxy resin is the glycidyl ether resins which are produced by reacting epichlorohydrin with a polyhydric substance. In the reaction, epichlorohydrin is combined with a polyol at a temperature of up to about 150° C. in the presence of alkaline or other type catalysts. Still another type of a suitable epoxy resin is obtained by epoxidation with peroxy compounds of double bonds in certain Diels-Alder adducts.

In general, epoxy resins require the addition of a curing agent or hardener in order to convert them to thermoset materials. In the curing process, both the epoxy and the hydroxyl groups of the resin may be involved, and the process can take place either at room temperature or at elevated temperatures. A great variety of hardeners or curing agents are available. The curing agents or hardeners most commonly used with epoxy resins are the following types:

(1) Amine-aliphatic and aromatic amines, polyamides, tertiary amines, and amine adducts.

(2) Acidic-acid anhydrides, and acids.

(3) Aldehyde condensation products-phenol-urea-, and melamine-formaldehyde resins.

(4) Lewis acid type catalyst-boron trifluoride complexes, etc.

Amount of hardener used will depend on amount and type of resin employed. For example, the mixing ratio of one commercial two-component adhesive based on epoxy resin is 1:10, hardener to resin. Selection of the hardener and determination of amount to be used is well known to those skilled in this art.

With respect to a commercial two-component adhesive based on epoxy resin, the following may be used as a correlation between the respective volumes of the measuring means (spoon) and the measuring compartments:

Measuring compartment: 1.1 cc., 2.2 cc., 3.3 cc.
Measuring means (spoon): 0.1 cc., 0.2 cc., 0.3 cc.

In the embodiment illustrated in FIG. 1, one of the components is a paste while the other is pulverulent which is stored in storage compartment 5. Assuming that the synthetic resin is in a paste form, the adhesive is made by measuring out a predetermined amount of pulverulent hardener from storage compartment 5 by means of measuring spoon 8 and depositing the hardener into one of the mixing compartments 1, 2. Selection of a particular mixing compartment will depend on the amount of adhesive desired. If only a small amount of adhesive is needed, then the smaller mixing compartment should be used. If a larger amount of the adhesive is needed, then, the larger compartment should be used.

Once the hardener has been measured out and deposited into a mixing compartment, the remaining volume of the mixing compartment is accurately filled with the synthetic resin paste. Mixing is done in the measuring compartment by means of spatula 7.

Figure 8:
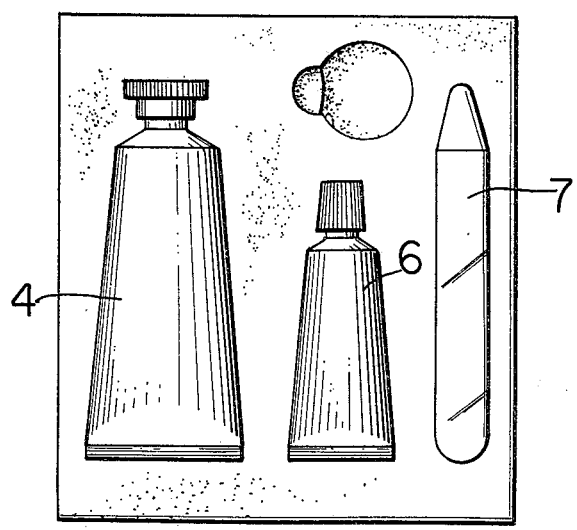
FIG. 8 is a plan view of still another embodiment.

When both adhesive components are in paste form, as illustrated by the embodiment depicted in FIG. 8, it is expedient to sub-divide the mixing compartment in two sections, each corresponding in volume to the proportions of the two components to be measured, so that the two sections, lying adjacent to one another, are bounded by a common removable divider, which can be a spatula or similar tool. As shown in FIG. 7, spatula 7 can be used, in the manner illustrated, to sub-divide a mixing compartment in two sections 3a, 3b. The two sections are filled with a corresponding component. The spatula is then removed and the components are brought together and mixed with the spatula.

Even with this construction of the measuring vessel, it is expedient to provide several vessels for the preparation of varying amounts of adhesive, the volumes of which vessels are in the ratio of 1:2:3 etc.

To prevent accumulation of the adhesive, or of the components thereof, on the walls of the mixing compartments as well as on the spatula, the compartments and the spatula can be made of special materials such as polyethylene, polypropylene, etc.

The preceding specific embodiments are illustrative of the practice of the invention. It is to be understood, however, that other expedients, known to those skilled in the art, may be employed without departing from the spirit of the invention.

We claim:

1. A kit for making an adhesive from two constituents which, when mixed, chemically set to form the required bond comprising a synthetic resin, a hardener, a measuring means, and one or more mixing compartments of varying volumes, the volumes of said measuring means and said mixing compartments are correlated to the mixing ratio of said hardener to said synthetic resin, thus permitting preparation of a lesser amount of adhesive than would be produced if all of said synthetic resin and said hardener were to be mixed at one time.

2. A kit of claim 1 wherein amount of said hardener is dictated by a predetermined mixing ratio of said resin to said hardener.

3. A kit of claim 2 wherein the volumes of said mixing compartments are in a ratio of 1:2:3 etc.

4. A kit of claim 3 wherein said measuring means is a measuring spoon.

5. A kit of claim 3 wherein said measuring means is a compartment which is adjacent to and being in communication with each of said mixing compartment or compartments.

6. A kit of claim 3 wherein said mixing compartment or compartments are made of polyethylene or polypropylene.

7. A kit of claim 2 including a tubular container for said resin.

8. A kit of claim 2 including a mixing spatula.

9. A kit for making an adhesive from a two-component system of a synthetic resin and a hardener, wherein at least one of the components is in a paste or a highly viscous form, comprising a carton, a synthetic resin, a hardener, a storage compartment in said carton for one of said components, the volume of which corresponds to the predetermined mixing ratio of said two components, and one or more mixing compartments in said carton whose volumes are correlated to the mixing ratio of said components.

10. A kit of claim 9 wherein the amount of said hardener is dictated by a predetermined mixing ratio of said components and wherein the volumes of said mixing compartments are in the ratio of 1:2:3 etc.

11. A kit of claim 9 including a measuring spoon whose volume is correlated to the volumes of said mixing compartments.

12. A kit for making the adhesive from a two-component system of a synthetic resin and a hardener, wherein said components are in a viscous form, comprising a carton, a synthetic resin, a hardener in a predetermined amount corresponding to the mixing ratio of said components, one or more mixing compartments in said carton, each one sub-divided into two chambers, the volumes of said chambers corresponding to the mixing ratio of said components.

13. A kit of claim 12 including a spatula.

14. A kit of claim 13 wherein said mixing compartments are made of polyethylene or polypropylene.

References Cited

UNITED STATES PATENTS

| | | | |
|---|---|---|---|
| 315,768 | 4/1885 | Goodwin | 73—426 |
| 2,645,127 | 7/1953 | Parks | 220—22 |
| 2,770,135 | 11/1956 | Parvin | 73—426 |
| 3,083,821 | 4/1963 | Woodson | 206—47 |
| 3,273,700 | 9/1966 | Moreau et al. | 206—1.7 |

WILLIAM T. DIXSON, JR., Primary Examiner

U.S. Cl. X.R.

206—1.7; 220—22